Jan. 29, 1924.
G. HARROLD
1,482,230
ADJUSTABLE SUNSHADE AND STORM CURTAIN FOR WINDSHIELDS
Filed Nov. 18, 1921
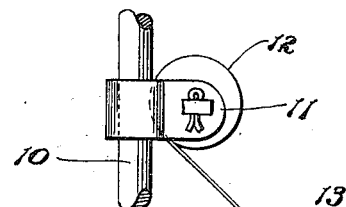
Fig.1.
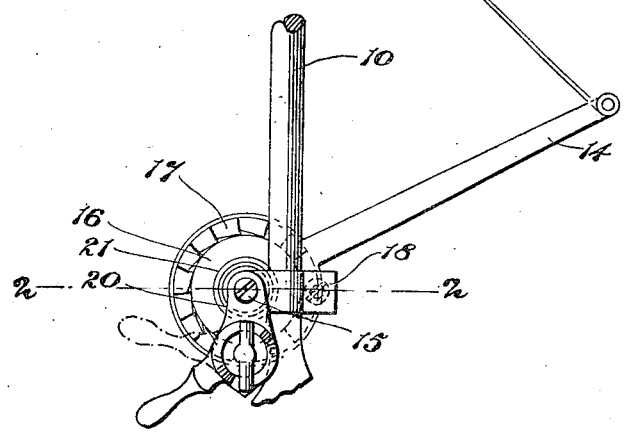
Fig.2.
Fig.3.
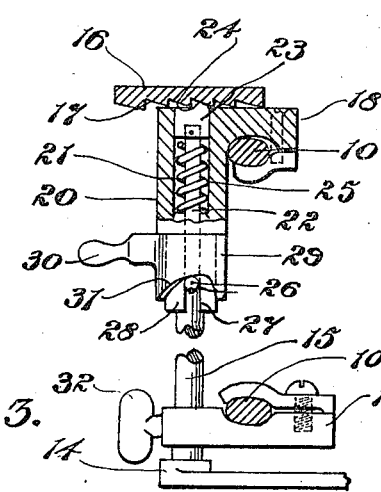
Inventor:
George Harrold.

Patented Jan. 29, 1924.

1,482,230

UNITED STATES PATENT OFFICE.

GEORGE HARROLD, OF LOS ANGELES, CALIFORNIA.

ADJUSTABLE SUNSHADE AND STORM CURTAIN FOR WINDSHIELDS.

Application filed November 18, 1921. Serial No. 516,081.

*To all whom it may concern:*

Be it known that I, GEORGE HARROLD, a citizen of the United States, residing at Los Angeles, in the county of Los Angeles and State of California, have invented new and useful Improvements in Adjustable Sunshades and Storm Curtains for Windshields, of which the following is a specification.

My invention relates generally to an adjustable sun shade and storm curtain for the wind shields of motor vehicles, the principal objects of my invention being to generally improve upon and simplify the construction of the existing types of similar devices and to provide a construction that is capable of being easily and cheaply produced and which will be very effective in positively locking the curtain-supporting arms in their adjusted positions.

With the foregoing and other objects in view, my invention consists in certain novel features of construction and arrangement of parts that will be hereinafter more fully described and claimed and illustrated in the accompanying drawings, in which:

Figure 1 is a vertical sectional view of an adjustable sun shade and storm curtain for windshields and showing my improved latching device in position thereupon;

Fig. 2 is a view, partly in section, taken through the center of the ratchet to show the locking mechanism, this view being taken approximately on the line 2—2 of Fig. 1.

Fig. 3 is a plan view showing the relationship of parts at one end of a connecting shaft extending between uprights at the opposite ends thereof, and to which my sun shade is secured.

Referring by numerals to the accompanying drawings, which illustrate a practical embodiment of my invention, 10, 10 designate the upright side members of a windshield frame, 11 the supporting brackets for a spring-actuated roller 12 upon which the windshield curtain 13 is adapted to wind, and the lower outer corners of which curtain are connected in any suitable manner to the outer ends of supporting arms 14.

The lower ends of these arms are secured in any suitable manner to a shaft 15, and the lower end of the left hand arm is provided with a disk 16 disposed about the shaft and provided on its inner face with a series of ratchet teeth 17. This shaft is journaled for rotation in a pair of clamping brackets 18 and 19 that are adapted to be secured in vertically adjusted positions upon the upright members 10 and formed integrally with bracket 18 that is adjustably arranged upon the left hand one of the uprights 10 is a depending lug 20, in the lower portion of which is formed a horizontally disposed aperture, the outer portion of which is enlarged in diameter as designated by 21. Arranged to slide freely through this aperture is a pin 22 carrying on its outer end a head 23 and formed on the outer face of said head is a tooth 24 that is adapted to engage the ratchet teeth 17 on disk 16.

Arranged on this pin and interposed between the head 23 and the shoulder at the inner end of the enlarged portion of said aperture is an expansive coil spring 25 that normally tends to force said pin outwardly so as to maintain the tooth 24 in engagement with the teeth 17. The inner end of pin 22 carries a transversely arranged pin 26, the latter being arranged for sliding movement in a diametrically arranged slot 27 that is formed in a short cylindrical head 28. This short cylindrical head extends outwardly from the lower portion of lug 20.

Arranged to rotate freely on head 28 is a short sleeve 29 from which projects laterally a short handle 30 and formed in the outer face of sleeve 29 is a pair of oppositely disposed notches 31, the bottoms of which are curved or inclined, thereby forming cam faces against which the end portions of pin 26 normally engage.

When the pin is at the inner or lower ends of these cam faces, the tooth 24 on the end of member 22 is in engagement with the teeth 17 on disk 16, thereby holding same and the arm 14 firmly in adjusted position, and when sleeve 29 is rotated so that the ends of pin 26 ride out of the notches or onto the high portions of the curved or inclined faces of notches 21 the tooth 24 on the end of member 22 will be withdrawn from the notches, thereby enabling disk 16 and rod 15 to be readily rotated and arms 14 swung into the desired angular positions.

As an additional safeguard to positively lock the shaft 15 against rotation in both directions after it has been properly adjusted, a set screw 32 is arranged in clamping bracket 19 so as to engage the shaft 15 when tightened.

Thus it will be seen that I have provided a relatively simple and practical latching device that will be effective in maintaining the curtain-supporting arms of a sun shade and storm curtain in their adjusted positions and which will prevent them from accidentally dropping, thereby carrying the curtain down into position where it would interfere with the vision of the driver of the vehicle to which the device is applied.

A device of my improved construction is comparatively simple, may be easily and cheaply produced and is very effective in performing its intended functions.

It will be understood that minor changes in the size, form and construction of the various parts of my improved curtain arm retaining device may be made and substituted for those herein shown and described without departing from the spirit of my invention, the scope of which is set forth in the appended claims.

I claim as my invention:

1. The combination with a windshield frame, of brackets adjustably arranged upon the side members of said frame, a shaft journaled in said brackets, curtain supporting arm carried by said shaft, a toothed disk carried by one of said arms, ratchet teeth formed on said disk, a spring-pressed pin arranged for operation in one of said brackets and adapted to engage said ratchet teeth for retaining the rod and the curtain supporting arms in adjusted positions, a cam adapted to be rotated to move said pin, and means for positively locking the other bracket to the windshield frame.

2. The combination with a windshield frame, of brackets adjustably mounted thereupon, a shaft journaled in said brackets, curtain supporting arms carried by said shaft, a spring pressed latching device arranged on one of said brackets for retaining the rod and the arms carried thereby in adjusted positions, a cam for moving said latching device, and means on the opposite bracket for positively locking the shaft against movement in either direction.

In testimony whereof I have signed my name to this specification.

GEORGE HARROLD.